(12) United States Patent
Sudo et al.

(10) Patent No.: US 7,226,554 B2
(45) Date of Patent: Jun. 5, 2007

(54) MOLDING DIE ASSEMBLY FOR RUBBER MEMBERS AND RUBBER MEMBER PRODUCED THEREBY

(75) Inventors: Masamichi Sudo, Tokyo (JP); Morihiro Sudo, Tokyo (JP); Kouichi Asai, Tokyo (JP)

(73) Assignee: Daikyo Seiko, Ltd., Tokyo (JP)

( * ) Notice: Subject to any disclaimer, the term of this patent is extended or adjusted under 35 U.S.C. 154(b) by 0 days.

(21) Appl. No.: 10/445,669

(22) Filed: May 27, 2003

(65) Prior Publication Data

US 2003/0205838 A1    Nov. 6, 2003

Related U.S. Application Data

(62) Division of application No. 09/487,952, filed on Jan. 19, 2000, now abandoned.

(30) Foreign Application Priority Data

Jan. 29, 1999    (JP)    ................................ 11-22291

(51) Int. Cl.
*B29C 43/02*    (2006.01)
(52) U.S. Cl. .................... 264/161; 264/319; 264/320
(58) Field of Classification Search ................ 264/161, 264/319, 320
See application file for complete search history.

(56) References Cited

U.S. PATENT DOCUMENTS

| | | | | |
|---|---|---|---|---|
| 2,148,079 | A | * | 2/1939 | Martin, Jr. .................... 249/52 |
| 3,957,411 | A | * | 5/1976 | Schiesser ..................... 425/215 |
| 4,036,675 | A | | 7/1977 | Amberg et al. |
| 4,252,294 | A | * | 2/1981 | Uchio ......................... 249/105 |
| 4,554,125 | A | * | 11/1985 | Knapp ........................ 264/266 |
| 5,078,941 | A | | 1/1992 | Tatsumi et al. |
| 5,217,668 | A | * | 6/1993 | Matsuzaki et al. .......... 264/161 |
| 2004/0099994 | A1 | * | 5/2004 | Brinkhues .................... 264/320 |

* cited by examiner

*Primary Examiner*—Christina Johnson
*Assistant Examiner*—Monica A Huson
(74) *Attorney, Agent, or Firm*—McCormick, Paulding & Huber LLP

(57) ABSTRACT

A molding die assembly includes an upper die and a lower die, wherein at least one of the upper and lower dies is provided with a cavity corresponding to the shape of a rubber member to be molded, wherein at least one of the upper and lower dies is provided with an annular projection around a cavity. The distance between the upper and lower dies at the annular projection is made smaller than the distance between the opposed surface portions, other than the cavity, of the upper and lower dies. A rubber member produced by the above mentioned molding die assembly is also provided.

6 Claims, 4 Drawing Sheets

MOLDING DIE ASSEMBLY FOR RUBBER MEMBERS AND RUBBER MEMBER PRODUCED THEREBY

CROSS REFERENCE TO RELATED APPLICATION

This application is a divisional of U.S. patent application Ser. No. 09/487,952 filed Jan. 19, 2000 now abandoned entitled MOLDING DIE ASSEMBLY FOR RUBBER MEMBERS AND RUBBER MEMBER PRODUCED THEREBY which is incorporated by reference herein.

BACKGROUND OF THE INVENTION

1. Field of the Invention

The present invention relates to a molding die assembly for a rubber member, such as a closure to be inserted in a mouth of a container, or a piston to be inserted into a syringe. The present invention also relates to a rubber member produced thereby.

2. Description of the Related Art

The above mentioned rubber member, having a cylindrical shape, is conventionally formed by a compression molding process. Namely, a masticated rubber material is preformed into a flat sheet of rubber as a raw material for molding, and the rubber sheet is molded into a predetermined shape using a molding die assembly including an upper die and a lower die having a plurality of cavities. The shortest (closest) distance between the upper die and the lower die of the die assembly is determined so that an appropriate distance is provided between opposed surfaces of the die surface portions of the upper and lower dies, other than the cavities. Rubber members molded in the cavities are interconnected by a thin rubber sheet extending between the opposed surfaces of the upper and lower dies. The rubber members removed from the die assembly, which are interconnected by the thin rubber sheet, and are cut from the thin rubber sheet, so that individual rubber members can be obtained.

FIG. 8 shows an example of a molding die assembly for a rubber piston 31. A lower die 10 is provided with a plurality of substantially cylindrical cavities 11 corresponding to the shape of the rubber piston 31. An upper die 20 is provided with projections with external threads (male screw portions) 25 which are inserted into the corresponding cavities 11 of the lower die 10, but do not contact the lower die 10. The masticated rubber material which has been preformed in a flat sheet is fed between the lower die 10 and the upper die 20. The die surface portion of the lower die 10 which is opposite to the upper die 20, other than the cavities 11, defines a flat surface 12. The closest distance "d" between the flat surface 12 and the upper die 20 upon molding is determined in accordance with the thickness of the masticated rubber material preformed in the form of a flat sheet. In general, the closest distance "d" is determined to be identical to the thickness of the masticated rubber material preformed in the form of a flat sheet.

FIG. 9 shows a molded product (sheet) 30 produced by the molding die assembly shown in FIG. 8, having a plurality of rubber pistons 31 which are interconnected by a thin rubber sheet 32. The rubber pistons (cylindrical rubber pistons) 31 are cut from the connecting rubber sheet 32 and are separated from one another, as shown in FIG. 10, in which the cut surface 33 is exposed. The rubber piston 31 is provided on the center portion thereof with a threaded hole (female screw portion) 35 formed by the threaded projection 25 of the upper die 20, so that a plunger of a syringe can be screw-engaged into the threaded hole (internal thread) 35.

FIG. 11 shows an example of a known molding die assembly for a rubber closure. The lower die 10 is provided with a plurality of cylindrical cavities 11 corresponding to the shape of the rubber closure. The upper die 20 is provided with a plurality of cavities 21 whose diameter is larger than the diameter of the cavities 11 and which are coaxial to the corresponding cavities 11. The die surface portion of the lower die 10 which is opposite to the upper die 20, other than the cavities 11, defines a flat surface 12. The die surface portion of the upper die 20 which is opposite to the lower die 10, other than the cavities 21, defines a flat surface 22. The closest distance "d" between the flat surfaces 12 and 22 upon molding is determined depending on the thickness of the masticated rubber material preformed in the form of a sheet. The molded product 40 thus obtained includes a plurality of rubber closures (molded members) 41 interconnected by a connecting rubber sheet 42. The individual rubber closures 41 are cut at cut surfaces 43.

The cut surfaces 33 or 43 of the above described individual rubber pistons 31 and rubber closures 41 are exposed. However, the exposed cut surfaces 33 or 43 are adhesive, so that if the exposed surfaces 33 or 43 are brought into contact with each other, the cut surfaces may adhere to each other. Moreover, when a large number of rubber pistons 31 or rubber closures 41 are conveyed along a conveyance line, they may interfere with a part of the conveying apparatus, interrupting the conveyance operation. Furthermore, the cut surface 33 of the rubber piston 31 increases the sliding resistance with respect to the inner barrel of the syringe. In addition to the foregoing, if the cut surface is large, i.e., if the axial length of the cut surface is large, the thickness of the connecting rubber sheet 32 or 42 is also large, thus resulting in an increased amount of wasted rubber material.

Obviously, the size of the cut surface can be, in theory, reduced by decreasing the closest distance "d" between the lower die 10 and the upper die 20. However, since the size of the cut surface is determined depending on the thickness of the masticated rubber material as mentioned above, it is very difficult in practice to make the cut surface smaller. In particular, if the masticated rubber material preformed in the form of a sheet is too thin, mold defects occur. To prevent this, in general, the thickness of the masticated rubber material to be fed between the upper and lower dies is set relatively large. Under these circumstances, a reduction in the size of the cut surfaces is restricted in the conventional molding die assembly.

SUMMARY OF THE INVENTION

It is an object of the present invention to provide a molding die assembly in which the size of the cut surfaces of simultaneously molded rubber members, at which the rubber members are cut from a connecting rubber sheet, can be made small.

Another object of the present invention is to provide a rubber member having a small cut surface.

In order to achieve the above mentioned objects, a molding die assembly is provided, including an upper die and a lower die, wherein one of the upper and lower dies is provided with a cavity corresponding to the shape of a rubber member to be molded, wherein one of the upper and lower dies is provided with an annular projection around the cavity; wherein the distance between the upper and lower dies at the annular projection is made smaller than the distance between the opposed surface portions, other than the cavity, of the upper and lower dies.

Preferably, the cavity is in the form of a cylinder substantially corresponding to the shape of a cylindrical rubber piston to be molded.

Preferably, the cavity is in the form of a cylinder substantially corresponding to the shape of a rubber closure to be molded.

In the case where the maximum diameter of the cavity is not greater than 10 mm, the closest distance between the upper and lower dies at the annular projections around the cavity is not greater than 0.5 mm. In the case where the maximum diameter of the cavity is in the range of 10 mm to 20 mm, the closest distance is not greater than 0.8 mm. In the case where the maximum diameter of the cavity is greater than 20 mm, the closest distance is not greater than 11.0 mm.

Preferably, the molding die assembly is made of stainless steel.

A rubber member can be produced using the above described molding die assembly structures.

According to another aspect of the present invention, a rubber member is provided, which is obtained by cutting the rubber member from a connecting rubber sheet including rubber member which is formed on the connecting rubber sheet, wherein said rubber member includes an annular recess which is formed around said rubber member on the connection rubber sheet, and wherein said rubber member is cut from the connecting rubber sheet at the annular recess to constitute a cut surface of said rubber member. In the case where the maximum diameter of the rubber member is not greater than 10 mm, the thickness of the cut surface is not greater than 0.5 mm. In the case where the maximum diameter is in the range of 10 mm to 20 mm, the thickness of the cut surfaces is not greater than 0.8 mm. In the case where the maximum diameter is greater than 20 mm, the thickness of the cut surfaces is not greater than 11.0 mm.

Preferably, the connecting rubber sheet including the rubber member is formed by a compression molding process.

The present disclosure relates to subject matter contained in Japanese Patent Application No. 11-22291 (filed on Jan. 29, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
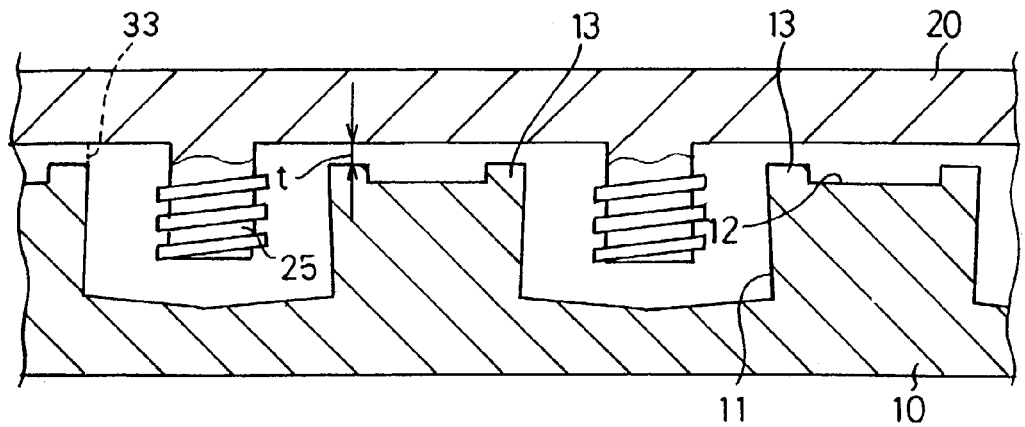
FIG. 1 is a sectional view of a first embodiment of a molding die assembly for molding rubber pistons according to the present invention.
Figure 8:
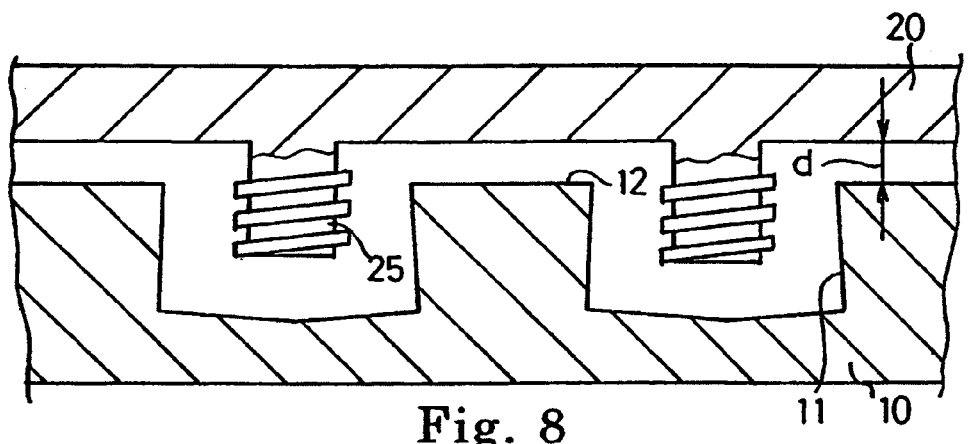
FIG. 8 is a sectional view of a known molding die assembly for molding rubber pistons.

FIG. 1 shows an embodiment of the present invention applied to a molding die assembly for a rubber piston. The die assembly in the illustrated embodiment is different from the known die assembly shown in FIG. 8, in that the lower die 10 is provided with annular projections 13 projecting toward the upper die 20 around the substantially cylindrical cavities 11. The remaining structure of the illustrated embodiment is the same as that shown in FIG. 8. Furthermore the upper die 10 and the lower die 20 are made of stainless steel.

Figure 2:
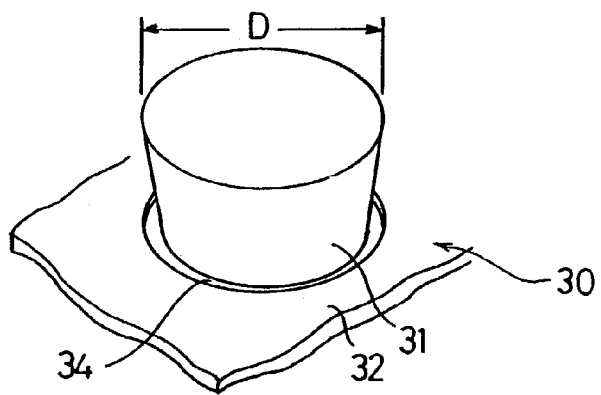
FIG. 2 is a perspective view of a mold sheet produced by a molding die assembly shown in FIG. 1.
Figure 9:
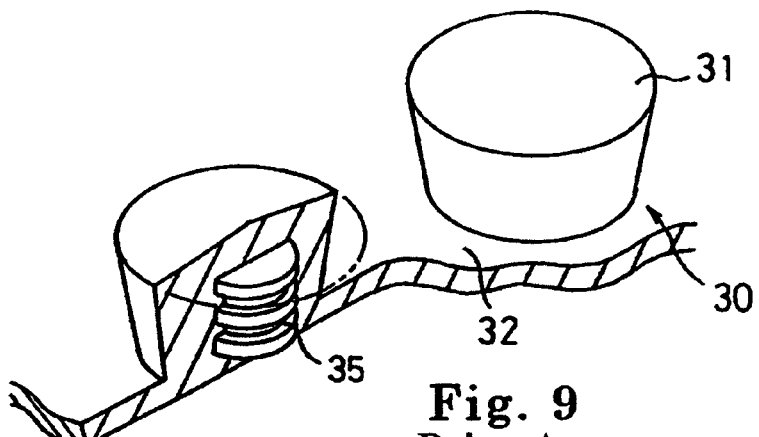
FIG. 9 is a perspective view of a mold sheet produced by a known molding die assembly shown in FIG. 8.
Figure 10:
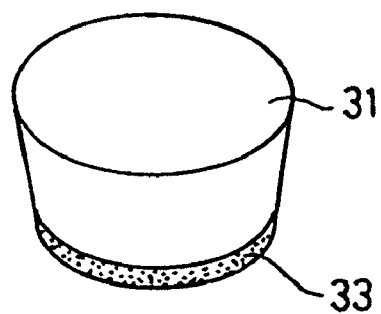
FIG. 10 is a perspective view of a single rubber piston separated from a mold sheet shown in FIG. 8.

With this structure, even if a masticated rubber material having a thickness the same as that used in the prior art, the minimum distance "t" between the projections 13 of the lower die 10 and the upper die 20 is made smaller than the distance "d" in the prior art. FIG. 2 shows a mold sheet 30 produced by the molding die assembly shown in FIG. 1. In FIG. 2, an annular recess 34, the depth thereof corresponding to the minimum distance "t", is formed around the rubber piston (cylindrical rubber piston) 31, so that the thickness of the connecting rubber sheet 32 is reduced at the recess 34. Consequently, the cut surface 33 at which the rubber piston 31 is cut and separated from the rubber sheet 31 can be reduced in comparison with the prior art shown in FIGS. 8 through 10. Thus, the above-mentioned problem with the cut surface can be substantially eliminated.

Figure 3:
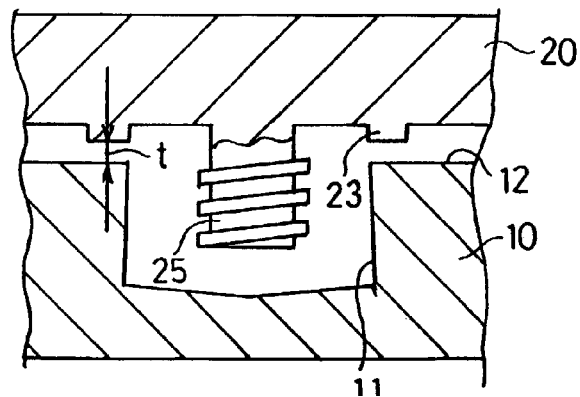
FIG. 3 is a sectional view of a second embodiment of a molding die assembly for molding rubber pistons according to the present invention.
Figure 4:
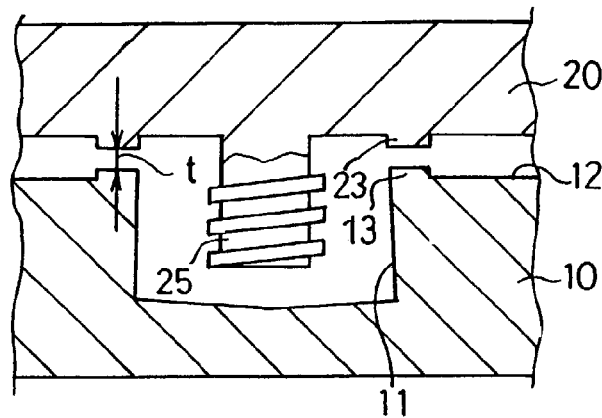
FIG. 4 is a sectional view of a third embodiment of a molding die assembly for molding rubber pistons according to the present invention.

FIG. 3 shows another embodiment of the present invention in which the annular projections 23 are formed on the upper die 20, in place of the annular projections 13 formed on the lower die 10, to surround the cavities 11 when the dies are closed. FIG. 4 shows yet another embodiment of the present invention, in which the annular projections 13 and 23 oppose each other, and are formed on the lower die 10 and the upper die 20, respectively, to surround the cavities 11 when the dies are closed. Accordingly, the closest distance "t" between the annular projections 23 of the upper die 20 and the lower die 10, or the closest distance "t" between the annular projections 23 of the upper die 20 and the corresponding annular projections 13 of the lower die 10 can be made smaller than the distance "d" of the prior art.

Figure 5:
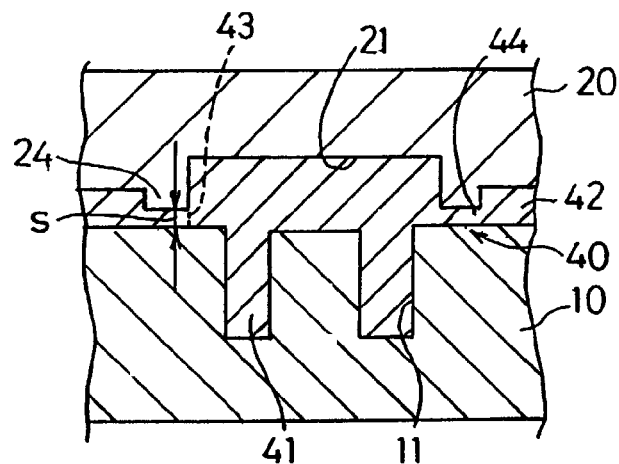
FIG. 5 is a sectional view of a first embodiment of a molding die assembly for molding rubber closures according to the present invention.
Figure 6:
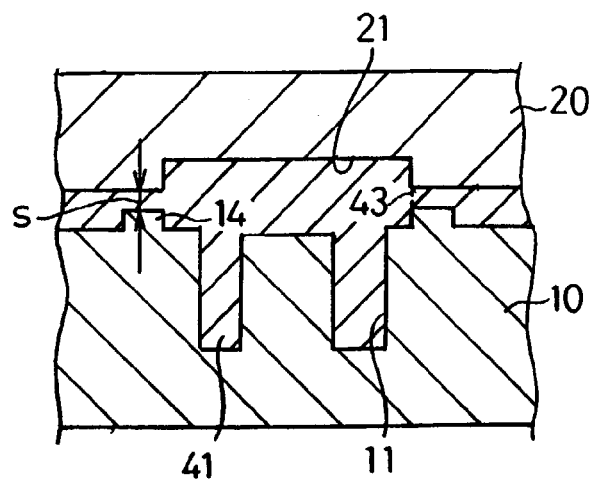
FIG. 6 is a sectional view of a second embodiment of a molding die assembly for molding rubber closures according to the present invention.
Figure 7:
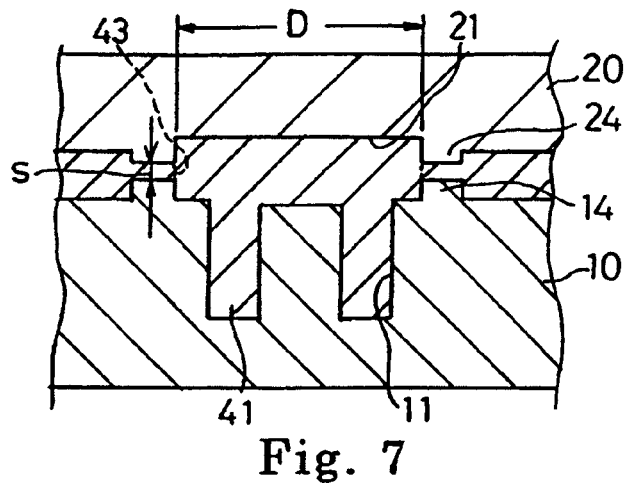
FIG. 7 is a sectional view of a third embodiment of a molding die assembly for molding rubber closures according to the present invention.
Figure 11:
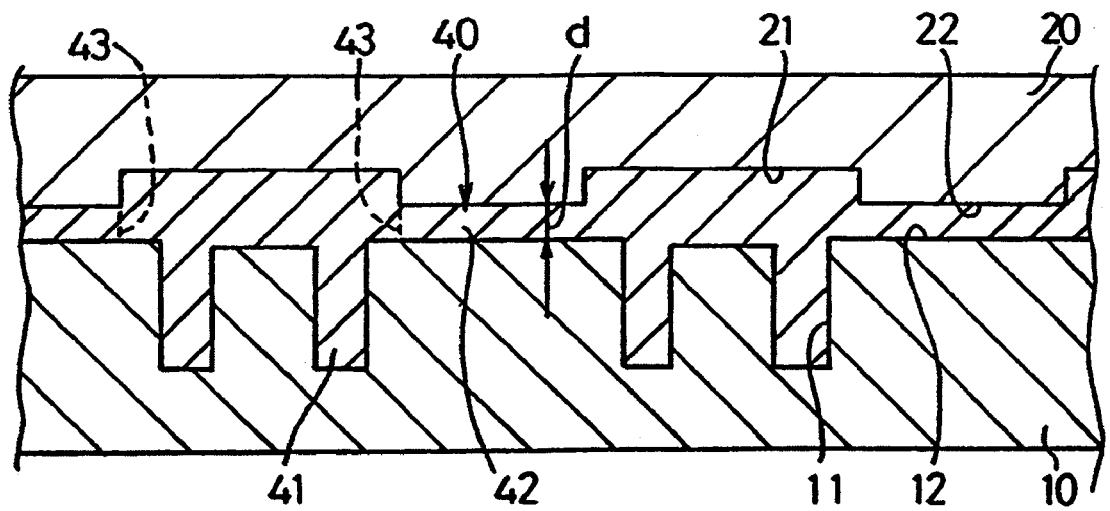
FIG. 11 is a sectional view of a known molding die assembly for molding rubber closures.

FIGS. 5 through 7 show an embodiment of the present invention applied to a molding die assembly for a rubber closure. In FIGS. 5 through 7, the elements corresponding to those in FIG. 11 are designated with like reference designators. In an embodiment shown in FIG. 5, the annular projections 24 which project toward the lower die 10 are formed around the cavities 21 of the upper die 20. In an embodiment illustrated in FIG. 6, the annular projections 14 which project toward the upper die 20 are formed around cavities 11 of the lower die 10. The inner diameter of the annular projection 14 corresponds to the inner diameter of the cavity 21. In an embodiment shown in FIG. 7, both the lower die 10 and the upper die 20 are provided with annular projections 14 and 24, respectively.

In the embodiments illustrated in FIGS. 5 through 7, even if a masticated rubber material having the same thickness as that of the prior art is used, the closest distance "s" between the annular projections 24 of the upper die 20 and the lower die 10, the closest distance "s" between the annular projections 14 of the lower die 10 and the upper die 20, or the closest distance "s" between the annular projections 24 of the upper die 20 and the annular projections 14 of the lower die 10, can be made smaller than the distance "d" of the prior art. Accordingly, an annular recess 44, the depth thereof corresponding to the minimum distance "s", is formed around the rubber closure (molded closure) 41, so that the thickness of the connecting rubber sheet 42 of the mold sheet 40 is reduced at the annular recess 44. Consequently, the cut surface 43, at which the rubber closure 41 is cut and separated from the connecting rubber sheet 42, can be reduced in comparison with the prior art shown in FIG. 11. Thus, the above-mentioned problem with the cut surface can be substantially eliminated.

Likewise with the prior art, the molding die assemblies in the above described embodiments can be utilized in a convenutal compression molding process.

The following rubber molds (pistons 31 or closures 41) were obtained using the molding die assembly described above, according to the present invention:

1) In the case where the maximum diameter D of the mold 31 or 41 (i.e., the maximum diameter of the cavities 21) is constructed not greater than 10 mm, the closest distance "t" or "s" is not greater than 0.5 mm;

2) In the case where the maximum diameter D is in the range of 10 to 20 mm, the closest distance "t" or "s" is not greater than 0.8 mm;

3) In the case where the maximum diameter D is greater than 20 mm, the closest distance "t" or "s" is not greater than 1.0 mm.

The masticated rubber material can be selected from IIR, NBR, BR, or EPDM, etc., and is not limited to a specific material.

As can be understood from the above discussion, the cut surfaces of the simultaneously molded rubber members at which the rubber members are cut from the mold rubber sheet can be made small. Consequently, the rubber member is substantially free from the problems that occur with a rubber member having a large cut surface.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A process for producing a compression molded article including the steps of:
   providing a molding die assembly comprising an upper and a lower die, said upper and said lower dies having opposed surface portions wherein at least one of said dies contains at least one cavity in one of said opposed substantially flat surface portions, said cavity having a shape which corresponds to the shape of the article to be molded, wherein at least one of said dies is provided with an annular projection around said cavity, said annular projection extending outward from one of said opposed substantially flat surfaces toward the other opposed substantially flat surface portions;
   positioning said dies so that said opposed substantially flat surface portions are in opposition, and are spaced apart wherein the distance between said opposed substantially flat surface portions at said annular projection is less than the distance between said opposed substantially flat surface portions, other than the cavity;
   placing a sheet of rubber between said opposed substantially flat surface portions; and
   decreasing the spacing between the opposed substantially flat surface portions to compression mold said rubber sheet, and to fill said at least one cavity, thereby forming a molded article in said cavity surrounded by a web of rubber between said opposed substantially flat surface portions, with said web containing an annular recess formed by said annular projection around said molded article.

2. A process as in claim 1 including the further step of cutting the molded article away from the web, said cutting being performed in said annular recess, and said cutting producing a cut surface on the molded article, so that the area of said article cut surface is reduced from what the area would have been if the annular recess were not present.

3. A process as in claim 1, wherein immediately adjacent said cavity, said annular projection has a first surface profile and a length and said opposed annular surface has a second surface profile, the first surface profile complementarily matching the second surface profile for the length of the projection.

4. A process for producing a compression molded article including the steps of:
   providing a molding die assembly comprising a first die and a second die, said first and said second dies each having substantially flat surface portions wherein said first die contains at least one cavity in said respective substantially flat surface portion, said cavity having a shape which corresponds to the shape of the article to be molded and wherein said second die is provided with an annular projection extending outward from said respective substantially flat surface portion;
   positioning said dies so that said substantially flat surface portions are in opposition and are spaced apart, wherein a distance between said substantially flat surface portion of said first die and said annular projection of said second die is less than a distance between said opposed substantially flat surface portions of said first and second dies;
   placing a sheet of rubber between said first and second dies; and
   decreasing the spacing between said first and second dies to compression mold said rubber sheet and to fill said at least one cavity, thereby forming a molded article in said cavity surrounded by a web of rubber between said opposed substantially flat surface portions, with said web containing an annular recess formed by said annular projection around said molded article.

5. A process for producing a compression molded article including the steps of:
   providing a molding die assembly comprising a first die and a second die, said first and said second dies each having substantially flat surface portions wherein said first die contains at least one cavity in said respective substantially flat surface portion, said cavity having a shape which corresponds to the shape of the article to be molded, wherein said first die is provided with an annular projection around said cavity and said second die is provided with an annular projection, each said annular projection extending outward from said respective substantially flat surface portion;

positioning said dies so that said substantially flat surface portions are in opposition and spaced apart and said annular projections are in opposition and spaced apart, wherein a distance between said first and second annular projections is less than a distance between said opposed substantially flat surface portions;

placing a sheet of rubber between said first and second dies; and decreasing the spacing between said first and second dies to compression mold said rubber sheet and to fill said at least one cavity, thereby forming a molded article in said cavity surrounded by a web of rubber between said opposed substantially flat surface portions, with said web containing opposed annular recesses formed by said opposed annular projections around said molded article.

6. A process for producing a compression molded article including the steps of:

providing a molding die assembly comprising an upper die and a lower die, said upper and said lower dies having opposed substantially flat surface portions wherein at least one of said dies contains at least one cavity in one of said opposed substantially flat surface portions, said cavity having a shape which corresponds to the shape of the article to be molded, wherein at least one of said dies is provided with an annular projection around said cavity, said annular projection extending outward from one of said opposed substantially flat surfaces toward the other opposed substantially flat surface portions;

positioning said dies so that said opposed substantially flat surface portions are in opposition;

placing a sheet of rubber between said upper die and said lower die; and decreasing the spacing between the upper and lower dies to compression mold said rubber sheet and to fill said at least one cavity, thereby forming a molded article in said cavity surrounded by a web of rubber between said opposed substantially flat surface portions, with said web containing an annular recess formed by said annular projection around said molded article, wherein a distance between said opposed substantially flat surface portions at said annular projection is non-zero for a length of the projection and less than a distance between said opposed substantially flat surface portions, other than the cavity.

* * * * *

UNITED STATES PATENT AND TRADEMARK OFFICE
CERTIFICATE OF CORRECTION

PATENT NO. : 7,226,554 B2 Page 1 of 1
APPLICATION NO. : 10/445669
DATED : June 5, 2007
INVENTOR(S) : Masamichi Sudo et al.

It is certified that error appears in the above-identified patent and that said Letters Patent is hereby corrected as shown below:

Claim 1.
Column 5, Line 59:   After "opposed" insert --substantially flat-- .

Claim 1.
Column 6, Line 2:   After "opposition" delete ",".

Signed and Sealed this

Thirty-first Day of July, 2007

JON W. DUDAS
*Director of the United States Patent and Trademark Office*